United States Patent [19]

Beauchamp et al.

[11] Patent Number: 4,761,154
[45] Date of Patent: Aug. 2, 1988

[54] BELT TENSIONER

[75] Inventors: Robert W. Beauchamp, Leucadia; Anthony W. Ebersole, Poway, both of Calif.

[73] Assignee: Hewlett-Packard Company, Palo Alto, Calif.

[21] Appl. No.: 55,101

[22] Filed: May 28, 1987

[51] Int. Cl.⁴ .............................................. F16H 7/08
[52] U.S. Cl. ................................... 474/101; 474/113
[58] Field of Search ................ 474/101, 102, 113-115

[56] References Cited

U.S. PATENT DOCUMENTS 2,544,774 3/1951 Bredl et al. .................... 474/113 X
4,437,648 3/1984 Thorn et al. ................... 474/113 X Primary Examiner—Stephen J. Novosad
Assistant Examiner—Thuy M. Bui
Attorney, Agent, or Firm—Eugene H. Valet

[57] ABSTRACT

A belt tensioner for a belt and pulley system is disclosed. The tensioner has a camming surface upon which a pulley axle rides, maintaining substantially uniform tension in the belt despite competing forces of the belt tension and a tensioner holding spring. The camming surface profile is generated, for example, when using a spring holding mechanism, by differentiating Hooke's Law.

16 Claims, 4 Drawing Sheets

BELT TENSIONER

DESCRIPTION

BACKGROUND OF THE INVENTION

1. Field of the Invention

The present invention relates generally to belt drive systems and, more particularly, to a belt tensioner for a reversible pulley system.

2. Description of the Related Art

In many belt drive system applications, it is important to optimize belt tension. The purpose of a belt tensioner is to maintain a substantially constant tension in a drive belt. In most applications, the belt connects stationary pulleys. Hence, belt tension can be set by affixing one pulley to a mount having an adjustable linkage to a fixed mounting surface. Automobile engine belts are common examples of this type of system.

However, in other applications, a belt drive system may be used where the belt is used to position another device. For example, a computer may be used to provide drive signals to an ink-jet printer (a high-speed printing process in which thermally excited ink is broken up into electrostatically charged droplets which are controlled by a computer program into positions that form printed characters on a print media). An ink pen carriage is rapidly and repeatedly scanned back and forth across the print media by providing a belt drive device in which the pen carriage is positioned by "riding" the belt. Positioning of the printhead to the print media is, of course, critical to prevent a printing error. Hence, belt tension is an important feature. One example of such a prior art mechanism is shown in FIG. 1 (prior art).

A belt 100 connects a reversible motor 300 to an idler pulley 500. The pulley axle 700 fits slidingly in slots 900 in mounting frame 110. The belt 100 extends through an aperture 130 in frame 110. A pen carriage (not shown) could ride a guide bar 150 and be attached to the belt 100. Since the pulley axle 700 makes a sliding fit and the belt must be long enough to reach beyond end 170 of the mount 110 to encircle the pulley 500 before fit into slots 900, a tensioner 190 is used to achieve the proper tension. After the pulley 500 is fit into the slots 900, the tensioner 190 is inserted such that the axle 700 will ride on tensioner surface 210. Extension tab 230, with tensioning spring 250 surrounding it, is rotatingly slipped into slot 270 of the mount 110. By designing to a close tolerance, the tensioner surface 210 will pull the pulley outward along the slots 900 just until the belt 100 is properly tensioned.

One concern is to maintain tension in the belt over a wide rage of tolerances in the assembly of a printer instrument. If the components are molded of plastic in order to reduce costs, tolerances become even more difficult to maintain. Furthermore, wedge type-tensioners 190 fail to compensate for the effect of varying spring 250 lengths and compression factors. Hence, a relatively wide range of belt tensions can result.

SUMMARY OF THE INVENTION

An advantage of the present invention is that it maintains tension in a belt over a wide range of tolerances in the manufacture and assembly of a system in which it is employed.

It is another advantage of the present invention that it provides a design which facilitates assembly into a system.

It is yet another advantage of the present invention that it provides compensation for varying tensioning spring deflections by utilizing a varying contact angle provided by a camming profile for the pulley axle.

It is a further advantage of the present invention that it provides tighter control of the range of belt tensions, allowing for the use of smaller low-cost motors and pinions.

In its basic aspects the present invention provides a tensioner for a belt and pulley system, comprising a handling means for inserting said tensioner into said system, and a pronged-body means connected to one end of said handling means, each prong having two substantially flat surfaces, each surface forming one edge being a substantially flat surface and a second edge forming a substantially curved surface for a riding pulley axle.

Other objects, features and advantages of the present invention will become apparent upon consideration of the following detailed description and the accompanying drawings, in which like reference designations represent like features throughout the FIGURES.

The drawings referred to in this description should be understood as not being drawn to scale except if specifically noted.

DETAILED DESCRIPTION OF THE INVENTION

Figure 2:
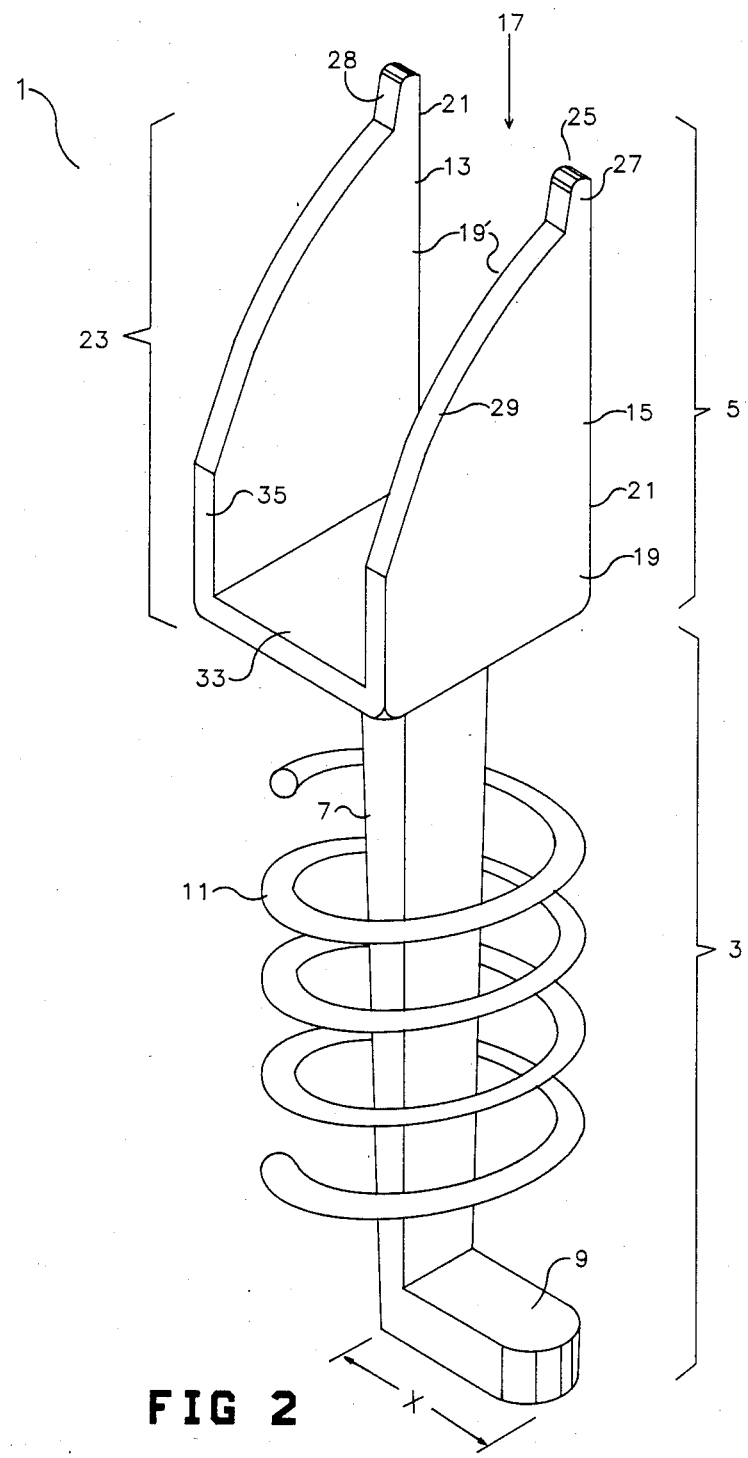
FIG. 2 is a perspective view depiction of the belt tensioner according to the present invention.
Figure 3:
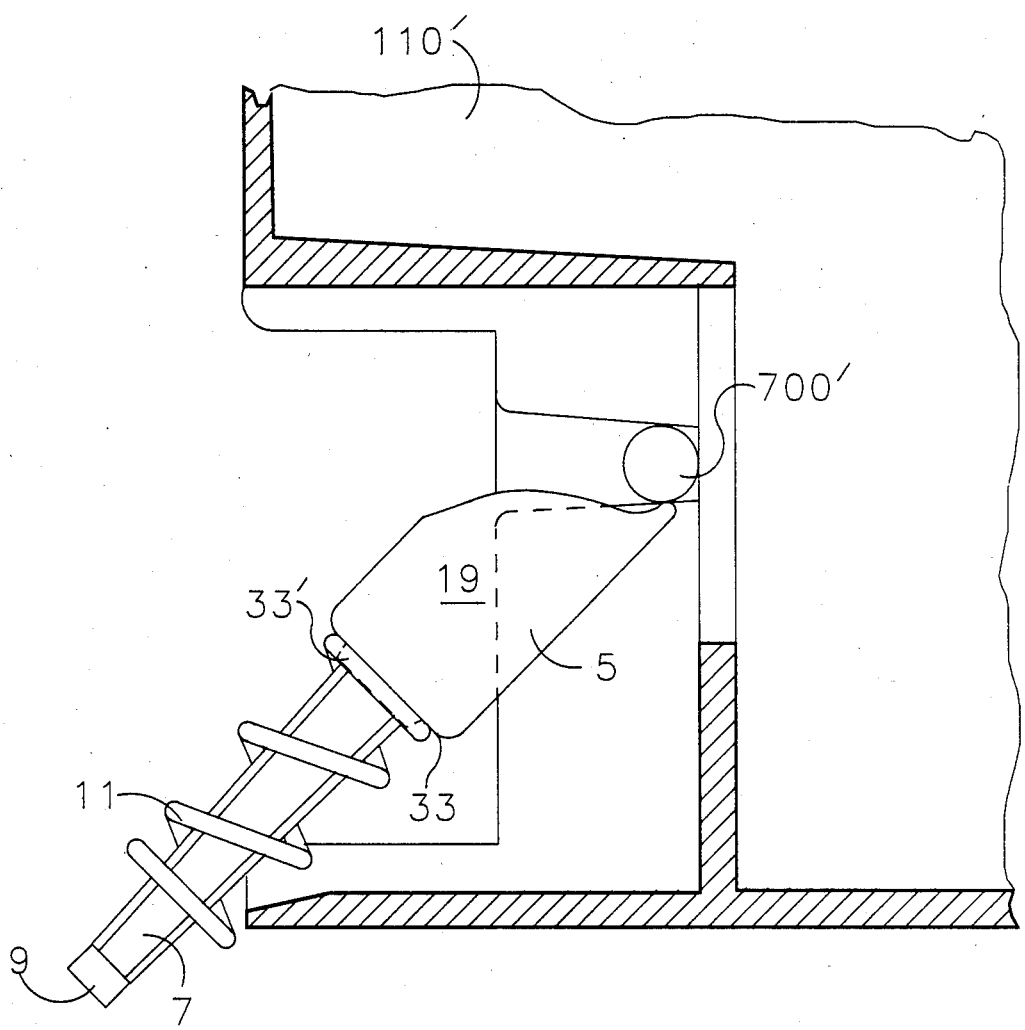
FIG. 3 is a plan view (side) depicting assembly with a pulley axle being captured by one tip of a tensioner prong according to the present invention as shown in FIG. 1.

Reference is made now in detail to a specific embodiment of the present invention, which illustrates the best mode presently contemplated by the inventor(s) for practicing the invention. Alternative embodiments are also briefly described as applicable. Referring now to FIGS. 2 and 3, an embodiment of a tensioner 1 in accordance with the present invention is depicted.

The tensioner 1 has two primary segments—a handle segment 3 and a pronged body segment 5. In the preferred embodiment as depicted and described, the invention is molded of a plastic material. This should not be taken as any limitation on the method or type of construction of the invention as many alternatives would be recognized by a person skilled in the art.

The handle segment 3 has a substantially straight shaft 7. At one extremity of the shaft 7, viz. distal from said body 5, an extension segment 9 forms an elbow with the shaft 7. It is preferred that the elbow form a right or acute interior angle with the shaft 7. At the other extremity of the shaft 7, viz. proximate to said body 5, the handle segment 3 is connected to the body 5. A helical spring 11 encompasses the shaft 7. The length of the spring 11 should be designed using standard engineering principles dependent upon the operational system specifications (e.g., for an ink-jet computer printer) and the design of the housing in which the tensioner 1 is to be used.

The handle segment 3 serves several functions. The elbow extension segment 9 serves as a convenient grip during assembly of a system. Furthermore, by intentional design, the inner diameter of the spring 11 can be made smaller than the length x of the extension segment 9 to keep the spring on the shaft 7 when the tensioner 1 is not in the instrument of the particular system for which it is designed. The outer diameter of the spring is less than the smaller cross-dimension of the base of 33 of the body segment 5. Thus, the spring 11 is captured, encompassing the shaft 7 between the extension segment 9 and the body base 33. In the preferred embodiment and as depicted in relief in FIG. 3, the lower surface of the base 33 can have a raised region 33' which has a circular periphery which has a diameter slightly less than the inner diameter of spring 11. Thus, when assembled, the spring 11 remains centered against the lower surface of the base 33.

The body segment 5 is shown to have two prongs 13, 15 as shown in FIG. 3. The gap 17 between the prongs 13, 15 should be adequate to allow a pulley to turn without interference, yet narrow enough such that the pulley axle will span the gap 17. In alternative embodiments, additional prongs could be added to adapt the tensioner 1 to uses with more than one pulley.

FIGS. 2 and 3 show that the prongs 13, 15 each have two substantially flat surfaces 19, 19'. In the present embodiment as design for a specific mount housing used in an ink-jet printer, one edge 21 of the surfaces 19, 19' is substantially flat. The opposite edge 23 is substantially curved to form a camming edge surface 23 having a changing radius of curvature.

At the extremity 25 of the ach prong 13, 15, the radius of edge 23 is relatively small in order to form a pointed tip 27 having a first edge surface 28. Referring to FIG. 3, it can be seen that the tip can be used to engage the pulley axle 700' when assembling the belt and pulley mechanism of the instrument for which it is adapted.

Proximate the tip edge 28 is second edge surface 23. Edge surface 23 has a changing radius of curvature. Edge surface 23 forms a second camming edge surface 29 for the axle 700'.

Proximate the second edge surface 23 and the body base 33 is a third edge surface 35. Edge 35 has a radius of curvature which is greater than said second edge surface 29. In the present embodiment, this edge surface 35 is substantially flat and parallel to edge surface 21.

As will be recognized by a person skilled in the art, other embodiments can have various edge surface regions forming edge 23 in accordance with the specific system requirements. The specific edge 23 configuration described above is not intended to be interpreted as a limitation on the scope of the invention.

Figure 4:
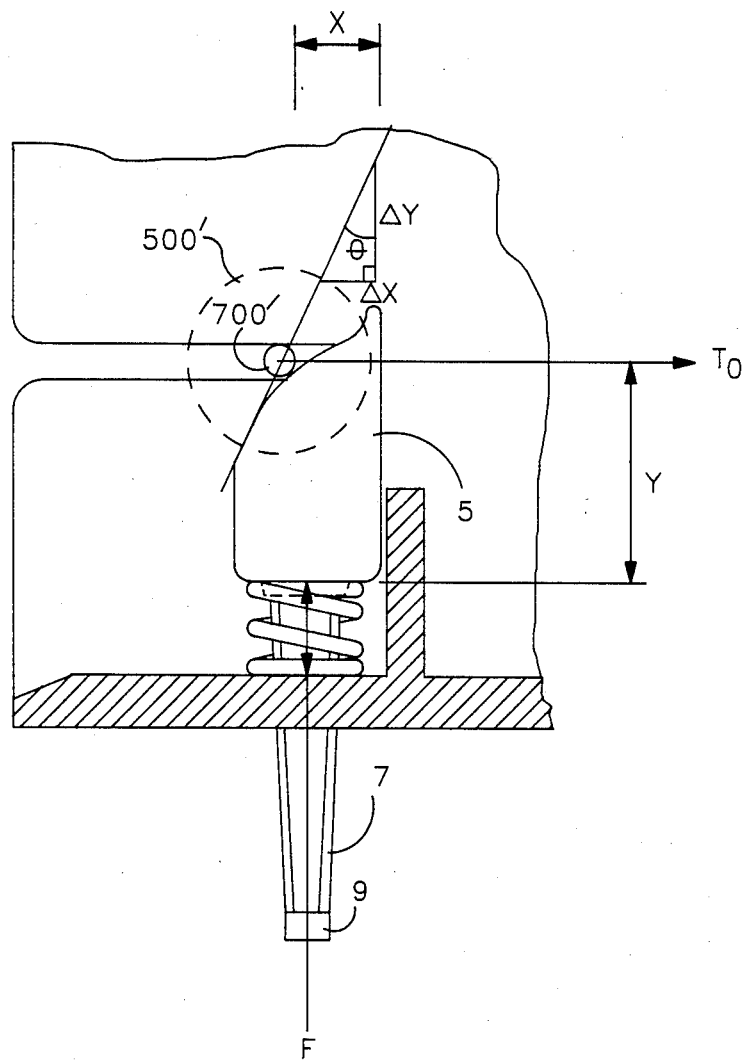
FIG. 4 is a plan view (side) of the depiction of the present invention as shown in FIG. 3 with the tensioner fully inserted into a housing and demonstrating the theory of design.

FIG. 4 depicts the present embodiment of the invention in full assembly. The specific dimensions can be designed in accordance with system requirements. The varying camming edge surface 29 maintains tension in the belt over a wide range of tolerances in the assembly of the instrument for which it is designed.

Figure 1:
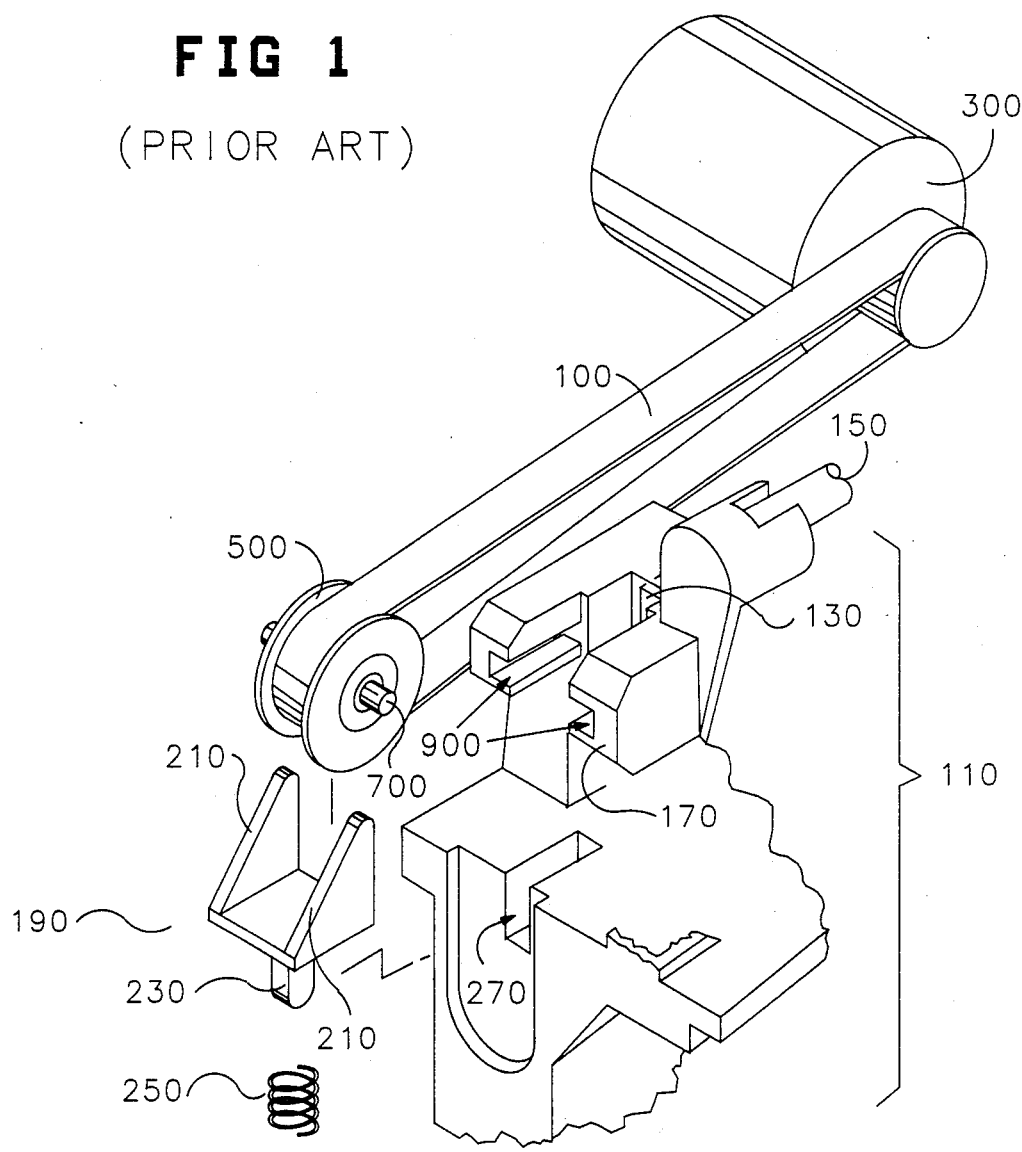
FIG. 1 is a perspective view depiction of a belt tensioner according to the prior art.

Referring now to FIG. 4, the changing radius of curvature of edge surface 29 is defined by a unique application of Hooke's Law for springs, viz. $F = 2T_o \tan \theta$, where F is the compression force exerted by the spring and $T_o$ is the tension force exerted by the belt 100. Conventional engineering practice, e.g. for a prior art device such as shown in FIG. 1, calls for determining a proper spring based upon a fixed theta angle once the tensioner design is established or the converse where the spring is fixed. The present invention provides a variable theta angle which compensates for changing spring forces. The equation is solved, in other words, to generate the profile of the camming edge's 29 changing angle.

$$F = 2T_o \tan \theta.$$

$$\tan \theta = \Delta x / \Delta y = F / 2T_o = Ky / 2T_o,$$

where
K=spring force constant.
Thus, $dy/dx = 2T_o/Ky$, is the differential equation for generating the camming edge 29 profile.

Therefore, this equation can be used to design a profile in accordance with the specific needs and design of the overall system.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A tensioner for a belt and pulley system, comprising:
   a handling means for inserting said tensioner into said system; and,
   a pronged-body means connected to one end of said handling means, each prong having two substantially flat surfaces, each surface having an edge forming a substantially curved surface for a riding pulley axle.

2. The tensioner as set forth in claim 1, further comprising a means for holding said tensioner in substantially fixed relationship to said belt.

3. The tensioner as set forth in claim 1, wherein said substantially curved surface has a varying radius of curvature.

4. The tensioner as set forth in claim 1, wherein each said prong has an extremity tip adapted to catch said axle and transfer said axle to ride on said substantially curved surface.

5. The tensioner as set forth in claim 2, wherein said holding means further comprises a spring.

6. The tensioner as set forth in claim 4, wherein said substantially curved surface has a profile angle to the plane perpendicular to the belt tension force vector defined by the equation:

$$\tan \theta = dx/dy = Ky/2T_o,$$

where
K=spring force constant, and
$T_o$=belt tension force constant.

7. The tensioner as set forth in claim 2, wherein said handling means further comprises:
   a shaft segment having one end connected to said body means; and,
   an extension segment at an end of said shaft distal from said body means, said extension forming an interior angle to said shaft segment less than or equal to ninety degrees.

8. The tensioner as set forth in claim 7, wherein said substantially curved surface terminates at a continuing surface edge region which is in a plane substantially parallel to said shaft segment and which is spaced adjacently to where said pronged-body means is connected to said one end of said shaft segment.

9. The tensioner as set forth in claim 7, wherein said spring has an inner diameter less than the length of said extension segment.

10. A belt tensioner for an endless-belt and pulley system, having at least one pulley, having an axle slidingly mounted in a mounting means, comprising:
    a handle segment; and,
    a pronged-body segment, having a base connected to one end of said handle segment, each prong having two substantially flat surfaces spaced such that said pulley fits freely between said flat surfaces, each surface having one edge being substantially flat and a second edge being substantially curved, such that said axle rides on said second edge when said pulley axle is mounted in said mounting means, and holding means for holding said tensioner in said mounting means.

11. The belt tensioner as set forth in claim 10, said substantially curved edge comprising:
    a varying profile having angle to the orthogonal to the belt tension force vector defined by the equation:

$$\tan \theta = dx/dy = Ky/2T_o,$$

where
    K=spring force constant, and
    $T_o$=belt tension force constant.

12. The belt tensioner as set forth in claim 10, wherein said handle further comprises:
    a shaft segment having one end connected to said body base; and,
    an extension segment at an end distal to said body base, said extension forming a right or acute angle to said shaft segment.

13. The belt tensioner as set forth in claim 12, wherein said holding means further comprises a helical spring encompassing said shaft segment.

14. The tensioner as set forth in claim 13, wherein said helical spring has an inner diameter less than the length of said extension segment.

15. In combination with an idler pulley having an axle freely mounted in a slot in a housing means, a belt tensioner, comprising:
    a handle segment, having a shaft and an extension segment at one end of said shaft, protruding at an angle of approximately ninety (90) degrees or less from said shaft;
    a helical spring encompassing at least a portion of said handle segment and adapted to hold said belt tensioner in said housing means; and
    a pronged body segment having a base connected to said handle segment at an end opposite said one end of said handle, each prong having;
    two substantially flat surfaces, spaced to span said idler pulley,
    a substantially flat edge surface forming one edge of said surface, and
    a second edge of said faces being a substantially curved surface, having a profile angle to the plane orthogonally perpendicular to the belt tension force vector defined by the equation:

$$\tan \theta = dx/dy = Ky/2T_o$$

where
    K=spring force constant, and
    $T_o$=belt tension force constant.

16. The belt tensioner as set forth in claim 15, wherein said spring has an inner diameter which is less than the length dimension of said extension and an outer diameter less than the smaller cross dimension of said base.

* * * * *